United States Patent [19]

Savary

[11] Patent Number: 4,668,267
[45] Date of Patent: May 26, 1987

[54] APPARATUS FOR THE FORMATION OF MINERAL FIBERS BY MEANS OF CENTRIFUGING WHEELS

[75] Inventor: Didier J. R. Savary, Mont Saint Aignan, France

[73] Assignee: Isover Saint Gobain, Courbevoie, France

[21] Appl. No.: 842,264

[22] Filed: Mar. 21, 1986

[30] Foreign Application Priority Data

Mar. 21, 1985 [FR] France .................. 85 04176

[51] Int. Cl.$^4$ .................................. C03B 37/05
[52] U.S. Cl. .................... 65/11.1; 65/3.43; 65/12; 65/15; 65/356; 156/62.4; 366/156
[58] Field of Search .............. 366/156, 157; 65/3.43, 65/356, 8, 15, 11.1, 12; 156/62.4

[56] References Cited

U.S. PATENT DOCUMENTS

| | | | |
|---|---|---|---|
| 366,784 | 7/1887 | McEnnaney | 366/156 X |
| 2,700,176 | 1/1955 | Graybeal | 65/15 |
| 2,882,552 | 4/1959 | Downey . | |
| 2,944,284 | 7/1960 | Tillotson . | |
| 3,022,538 | 2/1962 | Seherberg | 65/9 X |
| 3,827,888 | 8/1974 | Terwilliger et al. | 366/156 X |
| 4,433,992 | 2/1984 | Debouzie et al. | 65/3.1 |
| 4,594,086 | 6/1986 | Mosnier | 65/4.4 |

FOREIGN PATENT DOCUMENTS 0059152 of 0000 European Pat. Off. .
2038309 of 0000 France .

Primary Examiner—Robert Lindsay
Attorney, Agent, or Firm—Oblon, Fisher, Spivak, McClelland & Maier

[57] ABSTRACT

An apparatus for the manufacture of mineral fibers from a drawable material such as glass products, poured in the molten state onto a first centrifuging wheel before being conducted to a following wheel, each wheel transforming part of the molten material into fibers and dispatching the excess to the following wheel. A cooling water supply channel is arranged in the axis of each centrifuging wheel and is ridgidly coupled to the rotational movement of said wheel. Means of the helicoidal type, which are fixed to the channel, caused the water to advance to the end of the channel.

9 Claims, 5 Drawing Figures

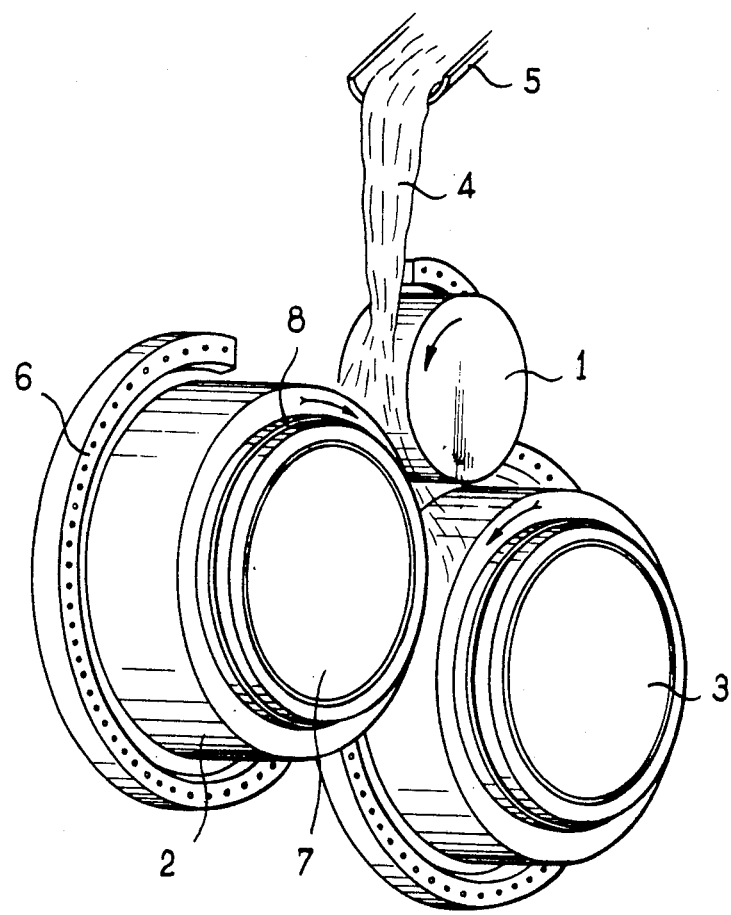
FIG_1

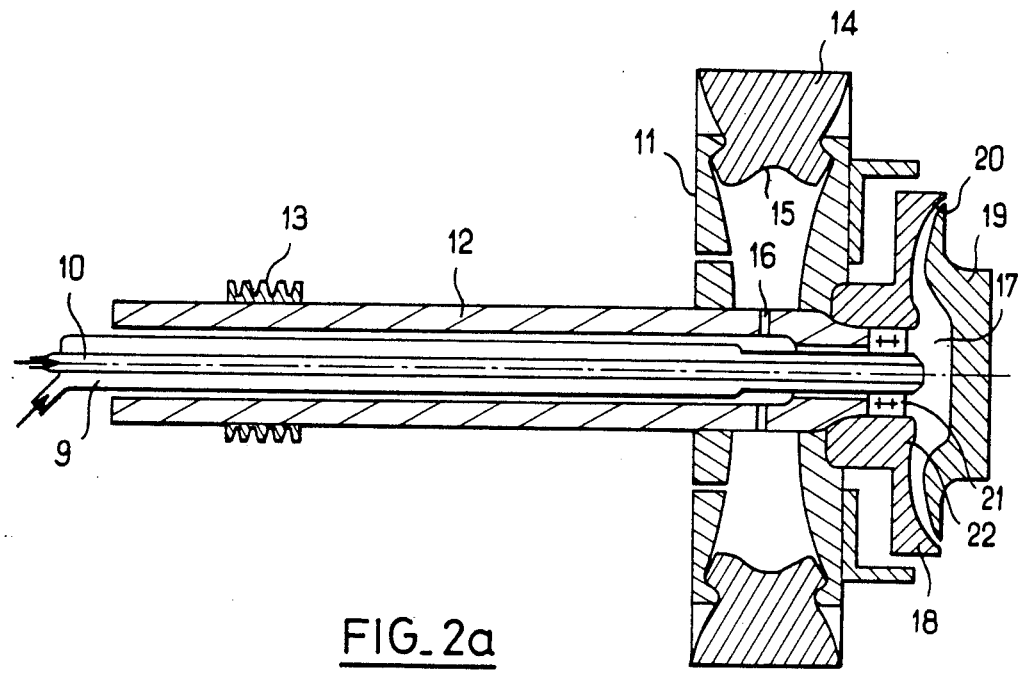
FIG_2a
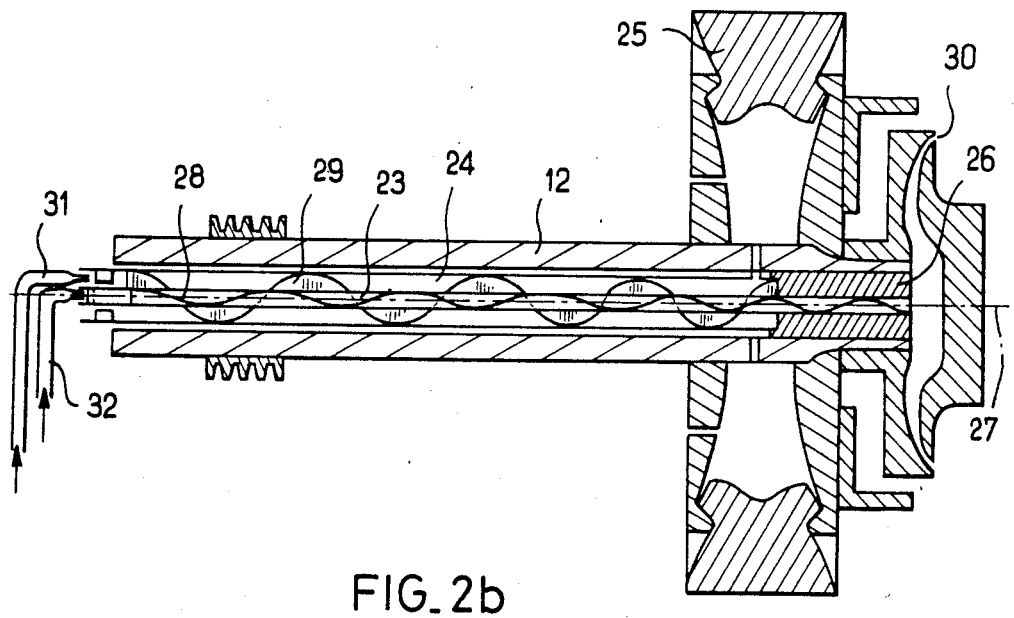
FIG_2b

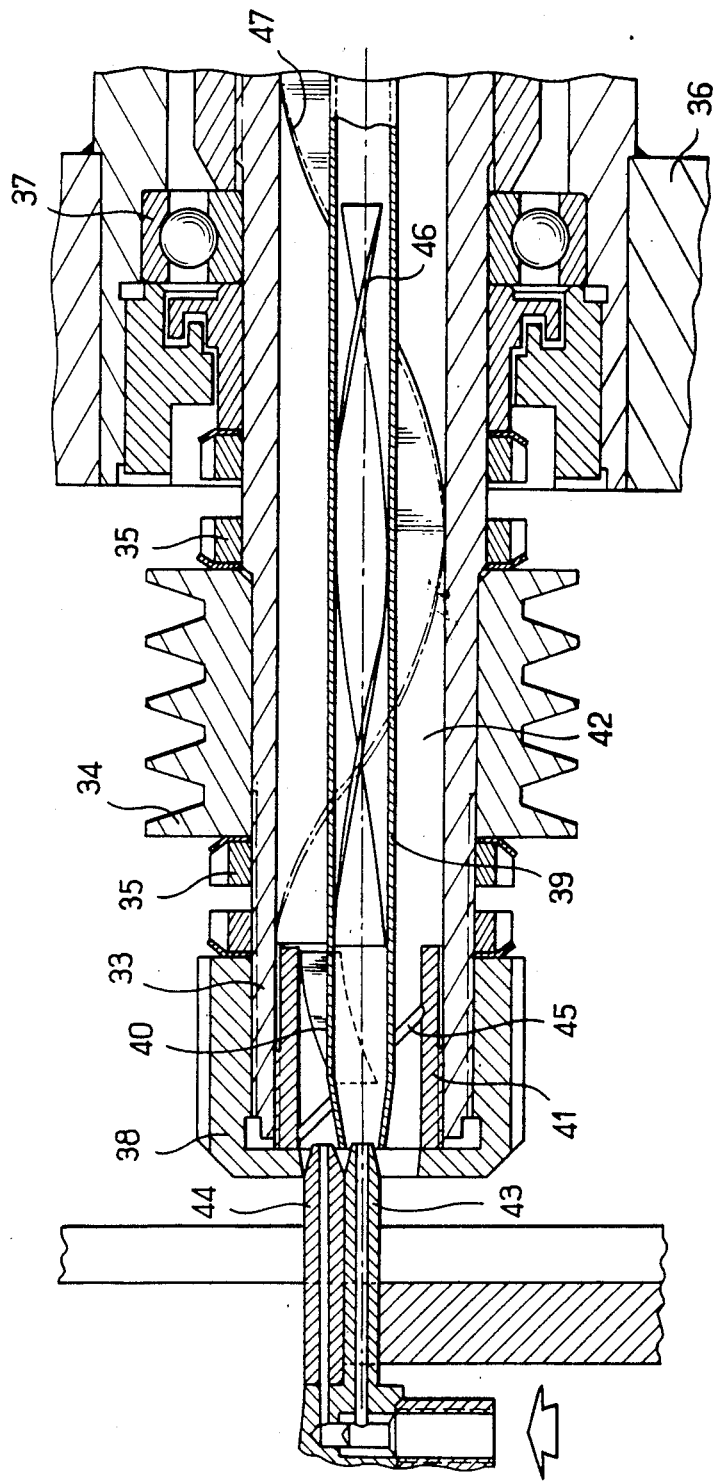
FIG_3

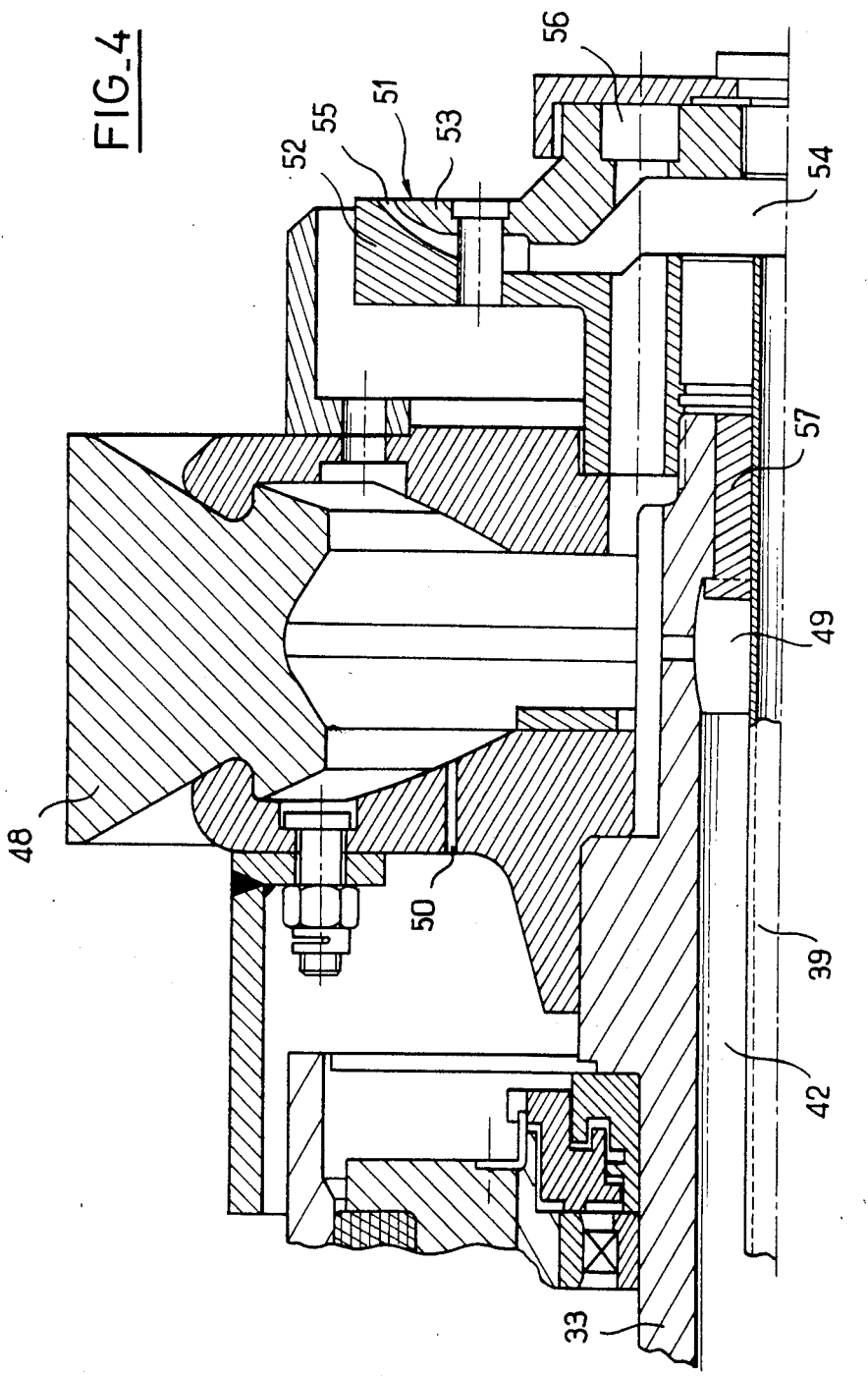
FIG_4

APPARATUS FOR THE FORMATION OF MINERAL FIBERS BY MEANS OF CENTRIFUGING WHEELS

BACKGROUND OF THE INVENTION

1. Field of the Invention

The invention relates to an apparatus for the manufacture of mineral fibers from a drawable material, by centrifuging.

2. Related Art

Techniques are known, known as free centrifuging, in which material to be formed into fibers is fed in the molten state to the periphery of fiber-forming wheels and is entrained by these wheels until it becomes detached from them in the form of fibers under the effect of centrifugal force.

In these techniques, there are generally used three or four centrifuging wheels arranged close to one another. The molten material is poured onto a first wheel, is accelerated, and is then ejected onto the following wheel. The drawable material thus passes from one wheel to the other, each wheel transforming a part of the molten material into fibers and discharging the remainder onto the following wheel.

These techniques are especially used for the industrial production of rock wool from basaltic glasses, high furnace slags, or more generally any materials having a very high melting point.

Numerous improvements of these techniques have been proposed, such as that disclosed in European Patent Application No. 82400315.6.

The centrifuging wheels are subjected to high temperatures by reason of their contact with the molten material. These high temperatures should, however, not be such as to cause deformation and/or wear which will be detrimental to the longevity of these wheels. It is for this reason that the traditional apparatus described in the above mentioned European application includes cooling means formed by the circulation of water via the axle of the wheel and reaching the internal surface of the periphery of the wheel.

To convey the cooling water to the hub of the wheel a supply channel is preferably arranged within the axle and coaxially with it. This supply channel is fixed, and retained by sets of roller bearing in the axle of the wheel which is in rapid rotation relative thereto. These roller bearings are generally situated at the end of the channel, to the side of the wheel. Seals ensure the water tightness of the cooling circuit and protect these roller bearings.

The rotational velocity of the wheels being very high, the roller bearings retaining the supply channel are strongly acted upon, especially against the sealing joints. It is therefore difficult to protect them completely against normal operational conditions. Also these roller bearings wear very rapidly and must be replaced very frequently to avoid any seizing which would result in rupture of the supply channel.

SUMMARY OF THE INVENTION

One object of the present invention is to provide an improved technique for supplying cooling water to centrifuging wheels, especially to permit a substantial lengthening of the life thereof.

According to the invention, very satisfactory results can be obtained by using supply channels fixed to the associated centrifuging wheels, without recourse to rotating joints which would form a weak point in the apparatus in view of the velocities attained.

According to the invention, the supply of cooling water to each of the centrifuging wheels is achieved by means of a channel arranged along the axis of the wheel axle and fixed for rotating with the centrifuging wheel.

This channel is provided with means the movement of which causes the cooling water to flow in the direction of the wheel. These means are fixed to the channel and preferably take the form of an element forming a helicoidal screw, but other equivalent means can be used, notably blades or vanes such as those used to form a turbine rotor. The liquid movement can also be provided by one or more helicoidal grooves formed in the wall of the channel.

At the opposite side of the axle which does not carry the centrifuging wheel, the channel carrying the cooling water is associated with coordinated injection means, for example a nozzle arranged to face the end of the channel.

At this opposite end the channel is open and no rotating joint is provided to ensure sealing between the injection nozzle and the channel. At the very most, in order to facilitate the continuity of the means conveying the cooling water, the nozzle may be inserted into the interior of the channel, but only for a small distance to avoid any risk of contact between the rotating channel and the fixed nozzle.

The water introduced into the channel rapidly comes into contact with means which advance the flow thereof to avoid any back flow. In the case where the means in question, such as a helix, extend only over a portion of the length of the channel, they will therefore be preferably located close to the end at which the water is introduced.

The maximum rate of supply is a function of the internal diameter of the channel, of the rotational velocity of the centrifuging wheel, and of the pitch of the helix.

The rotational velocity is determined by considerations which relate to the formation of the fibers and are thus not independently controllable. On the other hand, within certain limits the diameter of the channel and the pitch of the helix or equivalent means can be modified according to need.

While the maximum capacity of the channel corresponds to the flow rate of water injected under the chosen operative conditions, the "pumping" brought about by the channel takes place without running dry. This mode of operation can be obtained also be adjusting the flow rate of injected water. Conversely, when the injected flow is less than this maximum and thus when the channel is not completely filled, the risks of back flow are practically non-existent, both because the channel is in a horizontal position and also, as has been indicated, the means which draw the liquid are located at the upstream end of the channel. The liquid injected with a particular velocity is immediately taken up by these means and is directed towards the wheel. Under these conditions, the presence of air in the channel has no effect on good operation.

When the fibers produced are for the manufacture of insulating mats, the most common case, they should be coated by spraying with a liquid binder solution, for example, of the phenol-formaldehyde resin type, which after polymerization confers on the final product its mechanical properties and cohesion. This coating should be as homogeneous as possible and should not disturb the fiber forming operation as such. A particularly suitable solution is given in the above mentioned European application. This proposes the use of a centrifugal binder projecting device in the form of a disc which is coupled to the wheel on which the fibers are formed. This disc is composed of two coupled sidepieces which define a compartment communicating with the outside by one or more orifices from which the binder composition is discharged in the direction of the fibers which have just been formed. The binder composition is carried towards this compartment by a supply conduit which is also arranged along the wheel axis.

Preferably, concentric supply channels for the water and the binder are utilized. Preferably, the water channel surrounds the binder channel, the binder composition thus being protected against a possible increase in temperature before spraying.

In the prior art technique, the binder supply channel, which is situated within the water supply channel, is also fixed within the axle. According to the invention, when it is desired to introduce the cooling water and the binder simultaneously, the two channels are arranged concentrically within the axis of the axle, with which they are fixed.

Means analogous to those which have been described concerning the supply of water are used for the supply of binder. In particular, each of these channels is provided with means such as a helix to cause the liquid to flow, and the introduction of the liquid is brought about by injection at the open end of the channel. In this case, it goes without saying that one of the injection nozzles is disposed along the axis of the channel supplied by it, and that the other nozzle is offset therefrom. It is also possible to use as the second nozzle an annular injection nozzle surrounding the first nozzle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows schematically and in perspective a fiber-forming apparatus of the type used in the invention;

FIG. 2a is a schematic cross section of a centrifuging wheel including an assembly for the supply of cooling water and binder composition according to the prior art;

FIG. 2b is a schematic section corresponding to that of FIG. 2a and including a supply assembly according to the invention;

FIG. 3 is a detailed section of the injection zone of a supply assembly according to the invention; and FIG. 4 is a partial sectional view of the end of an apparatus carrying the fiber-forming wheel.

DETAILED DESCRIPTION OF THE PREFERRED EMBODIMENT

The description which follows is particularly related to a non-limiting embodiment.

In FIG. 1 there is shown a fiber-forming apparatus of the type used in the invention and which includes three centrifuging wheels 1, 2, and 3, the two successive wheels 2 and 3 turning in opposite senses relative to one another. Apparatus of the same type having four centrifuging wheels are also commonly used. The drawable material 4, in the molten state, is poured from a spout 5 onto the first centrifuging wheel 1 which is known as the distribution wheel because it produces no fibers and its role is essentially to accelerate the material 4 which can be formed into fibers and to distribute it onto the following wheel 2 onto which it is discharged and on which it partially adheres. The adhering molten material becomes detached from the wheel 2 under the effect of centrifugal force and then forms filaments which are taken up by the gaseous current created by the orifices of the blowing ring 6, while the non-adhering material is discharged onto the following centrifuging wheel 3 for the production, in the same manner, of further fibers.

The gaseous current carrying the fibers is directed transverse to the direction of projection of the fibers away from the wheel. A binder composition is centrifugally projected in the form of droplets by projecting means 7 into the gaseous current which divides the droplets so that the fibers which are formed are uniformally coated with binder.

The projecting means 7 is preferably surrounded by a collar 8 which protects the orifices thereof from the fibers.

The centrifuging wheels are cooled by water, preferably with a supply of cooling water which is controlled for each wheel as a function of the equilibrium temperature which is to be attained. Normally the temperature of the wheels in contact with the molten material will decrease from the first wheel 1 to the last wheel 3.

The supply of cooling water and binder composition is brought about be means of concentric channels shown in FIGS. 2a and 2b.

According to a prior art apparatus, shown schematically in FIG. 2a, the supply channels 9 for cooling water 10 and binder composition are fixedly mounted within the axle 12 along the axis of rotation of the corresponding centrifuging wheel 11. This wheel 11 is set in rotation with the axle 12, the rotation being transmitted from a motor (not shown) by belts arranged within the grooves of the pulley 13.

The centrifuging wheel 11 includes a peripheral band 14, shown as being smooth in the drawing but in practice being preferably provided with bumps, grooves, etc., which facilitate adherence of the molten material. Its internal structure 15 is exposed to cooling water supplied firstly by the channel 9 then by a series of orifices 16 pierced in the axle 12.

The liquid binder composition, supplied by the channel 10, passes into the atomizer 22 which includes the chamber 17, defined by the interengaged side pieces 18 and 19. The binder composition is then ejected under the effect of centrifugal force through the orifices 20 which form the aforesaid projecting means 7.

Centering of the axle 12 about its rotational axis, and maintenance of the two concentric channels 9 and 10 in the desired position is ensured by at least one roller bearing 21 mounted on the atomizer 22.

From experience it has become known that this roller bearing is the origin of the frequent breakage of the supply channels.

According to the invention and as shown in FIG. 2b, the supply channel 23 for the binder composition and supply channel 24 for cooling water are fixed to the axle 12 which carries the centrifuging wheel 25 as well as means 26 which permanently ensure perfect centering of channels 23 and 24 on the axis of rotation 27. The cooling water channel 24 surrounds the binder composition channel 23 so as to protect it from any undesired heating.

In order to induce the flow of the liquid compositions within the channels, each of the latter is provided with a helix, respectively 28 and 29. These helices act as pumps in the manner of an Archimedes screw, and allow the liquids to be accelerated sufficiently for the cooling water to reach the centrifuging wheel 25, for the binder composition to reach the projection means or atomizer 30. With the rotational velocities used, the two pumps have sufficient suction to avoid any back-flow of liquids towards the water and binder composition ejectors 31 and 32, each of which is arranged respectively at the end of the channels 23 and 24.

FIG. 3 is a detailed section of the injection zone of a supply assembly according to the invention.

A motor (not shown) which is preferably outside the fiber-forming zone where its operation would be disturbed by the fibers that are formed, sets the axle 33 of the centrifuging wheel in motion. This rotational movement is transmitted to the axle 33 by the pulley 34 which is maintained correctly positioned on the axle by the counter-screws 35.

The axle 33 is carried by a roller bearing 37 arranged on the support 36. At the center of the axle 33 is disposed the tube 39 inside which the binder composition circulates. The internal wall of the axle 33 and the external wall of the tube 39 for binder define the annular channel 42 in which the cooling water for the centrifuging wheel circulates.

This tube 39 is centered by three blades 40 of the supporting sleeve 41 which is screwed onto an internal thread of the axle 33. Apart from their centering function, these blades 40 also have the function of creating turbulence which facilitates the movement of the cooling water towards the centrifuging wheel. To avoid any accumulating of water at this point, the sleeve 41 also has three evacuation grooves 45 which are spiral shaped to advance the water.

A cap 38 screwed onto the external surface of the shaft 33 locks the sleeve 41 in position.

Liquid compositions are directed into the axle by the injector 43 for the binder and the injector 44 for the cooling water. These injections preferably extend partially into the axle and thus into the binder tube 39. The injection of cooling fluid is further facilitated by the truncated conical end of the tube 39 which increases the cross-section of entry of the cooling liquid.

The flow of the liquid compositions within the axle is ensured respectively by the helicies 46 and 47.

The helix 46 for the binder composition is located inside the tube 39. Given the small diameter of this tube, it is unnecessary for the helix 46 to extend over the whole length of the tube. Since the binder composition which is continuously admitted is urged in the direction of the wheel by the binder therebehind. The helix 46 can be fixed by brazing onto the tube 39 or quite simply force fitted.

The tube 39 also carries on its external wall the helix 47 which is preferably fixed by brazing. This helix, which on FIGS. 3 and 4 extends over the whole length of the tube 39, causes the flow of the cooling water.

Here the helicies 46 and 47 are shown as having the same pitch, however there is no requirement for this. A pitch of 20 centimeters corresponds, for example, to a circulation velocity of liquid compositions of 20 m/s for a rotational velocity of the order of 6000 rpm. Now, as 300 to 400 liters per hour of water are used for cooling and between 150 and 500 liters per hour of binder composition are used, the entry velocities of the liquid compositions are between about 12 and 16 m/s for the cooling water and 6 to 20 m/s for the binder composition, with injectors having an orifice diameter of 3 mm. Thus, the circulation velocity of the liquid compositions is always greater or equal to their entry velocity and no back-flow occurs. On the contrary, a certain quantity of air is also sucked in.

This system of helicies is very flexible in use, since if, for example, greater quantities of liquid compositions need to be injected, it is sufficient merely to replace the tube for binder composition 39 by a tube provided with helicies of a greater pitch.

The other end of the axle 33 is shown in FIG. 4 which is a partial upper section of the centrifuging wheel in which the centrifuging wheel 48 is mounted on the axle 33.

Cooling of the centrifuging wheel 48, and more particularly its peripheral surface, is ensured by the water conducted by the channel 42 to the chamber 49 which is closed on the right by the ring 57, which constitutes the centering means 26 and not only prevents the water from mixing with the binder composition, but also fixes the tube 39 which is thus rendered solid with the axle of the centrifuging wheel.

On contact with the wheel 48, a portion of the waver vaporizes, and the resulting mixture of water and steam is propelled by centrifugal force through the orifices 50.

The binder composition circulating in the tube 39 is conducted to the projection means 51, formed of two interengaged side pieces 52 and 53 which define a compartment 54 into which the binder passes before escaping through the orifices 55. This projection means is screwed onto the head of the axle 33, and held against rotation by the screw 56. The means for cooling and supplying binder composition which has thus been described includes no roller bearing or sealing joint specific to this aparatus. Thus, the lifetime of the fiber forming apparatus is substantially increased and the apparatus has the advantage of very great flexibility because it permits a very great variation in the flow rates of the liquid compositions injected.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for the production of mineral fibers from a drawable material having a high melting point, comprising:

a plurality of centrifuging wheels positionable such that molten drawing material may be poured thereon;

hollow rotatable axles, each having one end fixed to one of said wheels, whereby said wheels may be rotated to transform said drawable material poured thereon into fibers;

means for supplying water to the interior of said axles at a position spaced from said one end, whereby the interior of each said axle defines a water supply channel;

means in said water supply channel for advancing water to said end of said axles in response to rotation of said axles for cooling said wheel; and means defining a binder composition supply channel positioned concentrically within said cooling water channel and rotatable therewith, whereby molten drawable material poured on said centrifuging wheels is formed into fibers.

2. The apparatus of claim 1 wherein said means for advancing comprise a helicoidal screw within each said hollow axle.

3. The apparatus of claim 1 wherein said means for supplying water includes means for supplying water to another end of said axle spaced from said one end.

4. The apparatus of claim 3 wherein said means for supplying comprise an injector extending into said another end of said axle.

5. The apparatus of claim 1 wherein said means defining a binder composition supply channel comprises a concentric tube fixed within said axle, an annular space between said axle and said tube comprising said water supply channel, the interior of said tube comprising said binder composition supply channel.

6. The apparatus of claim 2 wherein said means defining a binder composition supply channel comprises a concentric tube fixed within said axle, an annular space between said axle and said tube comprising said water supply channel, the interior of said tube comprising said binder composition supply channel.

7. The apparatus of claim 2 including helicoidal screw means in said tube for advancing said binder composition of said wheel.

8. The apparatus of claim 7 wherein said helicoidal screw means does not extend to said one end of said axle.

9. The apparatus of claim 6 wherein said tube is tapered in a truncated conical form at another end thereof opposite said one end of said axle.

* * * * *